United States Patent
Remenik

(10) Patent No.: US 10,781,954 B2
(45) Date of Patent: Sep. 22, 2020

(54) FASTENING SYSTEM

(71) Applicant: Hamat Sanitary Fittings and Castings Ltd., Ashdod (IL)

(72) Inventor: Zvi Remenik, Ashdod (IL)

(73) Assignee: HAMAT SANITARY FITTINGS AND CASTINGS LTD., Ashod (IL)

( * ) Notice: Subject to any disclaimer, the term of this patent is extended or adjusted under 35 U.S.C. 154(b) by 0 days.

(21) Appl. No.: 15/972,272

(22) Filed: May 7, 2018

(65) Prior Publication Data
US 2019/0316715 A1    Oct. 17, 2019

(30) Foreign Application Priority Data
Mar. 28, 2018   (IL) .......................................... 258445

(51) Int. Cl.
*F16L 37/00*    (2006.01)
*E03C 1/04*    (2006.01)
*F16B 21/16*    (2006.01)
*F16B 1/00*    (2006.01)

(52) U.S. Cl.
CPC .......... *F16L 37/004* (2013.01); *E03C 1/0404* (2013.01); *F16B 21/16* (2013.01); *F16B 2001/0035* (2013.01)

(58) Field of Classification Search
CPC ................... F16L 37/004; F16B 2001/0035
USPC ....................................................... 285/9.1
See application file for complete search history.

(56) References Cited

U.S. PATENT DOCUMENTS

| | | | | |
|---|---|---|---|---|
| 4,260,180 A | * | 4/1981 | Halushka | F16L 37/004 285/391 |
| 10,260,216 B2 | * | 4/2019 | Zhu | E03C 1/0404 |
| 2015/0014986 A1 | * | 1/2015 | Chen | E03C 1/0404 285/9.1 |

FOREIGN PATENT DOCUMENTS

| EP | 1628065 A2 | * | 2/2006 | ............ F16L 37/004 |
|---|---|---|---|---|
| WO | WO-03016672 A1 | * | 2/2003 | ............ F16L 37/004 |

* cited by examiner

*Primary Examiner* — David Bochna
(74) *Attorney, Agent, or Firm* — JMB Davis Ben-David

(57) ABSTRACT

A system for selectably fastening a female member with a male member adapted to fit inside the female member, the female member having one or more inward-facing recesses and the male member having one or more outward-facing recess, the recesses being of similar cross-sectional dimensions, includes one or more moveable, ferromagnetic locking elements housed within the inward-facing recesses of the female member; and a locking magnet mounted onto the male member, in magnetic proximity to the one or more outward-facing recesses, wherein, in the presence of a magnetic force applied by the locking magnet, mating of the male and female members bringing the outward-facing and inwardly-facing recesses into mutual registration causes the locking elements to move inwardly into the outward-facing recesses so as to extend across both of the inward- and outward-facing recesses, thereby to lock the male and female members together.

17 Claims, 10 Drawing Sheets

FASTENING SYSTEM

CROSS-REFERENCE TO RELATED APPLICATIONS

This application claims the benefit of priority to Israel Patent Application No. 258445, filed Apr. 15, 2018, and entitled "Fastening System". The entirety of the aforementioned application is incorporated herein by reference.

BACKGROUND

The invention relates to fastening systems.

Fastening of male and female members is known using a variety of different types of fasteners. Such fasteners include screws, screw assemblies, nails and weld studs with variety of thread and point designs, as well as spring loaded bearings. These types of fasteners are normally exposed and are in many cases unsightly, inefficient and require a tool such as a screwdriver for use.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system for selectably fastening a female member with a male member adapted to fit inside the female member, wherein the female member has one or more inward-facing recesses and the male member has one or more outward-facing recess, the recesses being of similar cross-sectional dimensions, and wherein the male and female members are configured for mutual positioning so as to bring the outward-facing and inwardly-facing recesses into mutual registration, wherein the system includes:

one or more moveable, ferromagnetic locking elements housed within the one or more inward-facing recesses formed in the female member; and a locking magnet mounted onto the male member, in magnetic proximity to the one or more outward-facing recesses, wherein, in the presence of a magnetic force applied by the locking magnet, mating of the male and female members so as to bring the outward-facing and inwardly-facing recesses into mutual registration causes the one or more moveable, ferromagnetic locking elements to move inwardly into the one or more outward-facing recesses so as to extend across both of the one or more inward-facing and outward-facing recesses, thereby to lock the male and female members together.

Additionally, in the presence of a magnetic force opposite to and greater than the magnetic force applied by the locking magnet, the one or more moveable, ferromagnetic locking elements are operative to move outward from the one or more outward-facing recesses of the male member, thereby to unlock the male and female members.

Further, the one or more inward-facing and outward-facing recesses include two or more mutually indexable pairs of inward-facing and outward-facing recesses, and the one or more moveable, ferromagnetic locking element include two or more moveable, ferromagnetic locking elements.

Additionally, the male and female members have cylindrical end portions adapted for mating engagement, the one or more outward-facing recesses are constituted by a circumferential locking groove;

the one or more inward-facing recesses is at one or more locking element housing recesses formed to be in registration with the circumferential locking groove; and the locking magnet is mounted onto the male member, in magnetic proximity to the circumferential locking groove, such that in the presence of a magnetic force applied by the locking magnet, mating of the male and female members so as to bring the one or more locking element housing recesses into registration with the circumferential locking groove causes the one or more moveable, ferromagnetic locking elements to move inwardly into the circumferential locking groove so as to extend across both of the one or more locking element housing recesses into registration with the circumferential locking groove, thereby to lock the male and female members together.

Further, the one or more locking element housing recesses include two or more locking element housing recesses, and the one or more moveable, ferromagnetic locking elements include two or more moveable, ferromagnetic locking elements.

Additionally, the two or more locking element housing recesses include a pair of diametrically opposed locking element housing recesses.

Further, the cylindrical end portions are mounted along a common axis of symmetry, and the circumferential locking groove is formed along the entire circumference of the male member, thereby facilitating full, relative axial rotation of the cylindrical end portions, one to the other.

Additionally, the system also includes a magnetic tool formed so as to fit over the exterior of the female member, operative to apply to the one or more ferromagnetic locking elements a magnetic force opposite to and greater than the magnetic force applied by the locking magnet, thereby to unlock the male and female members.

Further, the system also includes a magnetic tool having a cylindrical inward-facing surface formed so as to fit about the cylindrical end portion of the female member, operative to apply to the one or more ferromagnetic locking elements a magnetic force opposite to and greater than the magnetic force applied by the locking magnet, thereby to unlock the male and female members.

Additionally, the magnetic tool is an annulus.

Further, the male member is a faucet body and the cylindrical end portion thereof includes the spout nipple thereof; and the female member is a faucet spout and the cylindrical end portion thereof is configured for mating connection with the spout nipple.

There is also provided a faucet which includes: a faucet body having a nipple connected thereto, the nipple having one or more outward-facing recesses;

a spout having an end portion for mating engagement with the nipple and having one or more inward-facing recesses, the outward- and inward-facing recesses being of similar cross-sectional dimensions and formed to be in mutual registration when the end portion of the spout is positioned over the nipple;

one or more moveable, ferromagnetic locking elements housed within the one or more inward-facing recesses formed in the end portion of the spout; and a locking magnet mounted onto the nipple, in magnetic proximity to the one or more outward-facing recesses thereof, wherein, in the presence of a magnetic force applied by the locking magnet, mating of the spout and the nipple so as to bring the outward-facing and inwardly-facing recesses into mutual registration causes the one or more moveable, ferromagnetic locking elements to move inwardly into the one or more outward-facing recesses so as to extend across both of the one or more inward-facing and outward-facing recesses, thereby to lock the spout to the faucet body.

Further, in the presence of a magnetic force opposite to and greater than the magnetic force applied by the locking magnet, the one or more moveable, ferromagnetic locking elements are operative to move outward from the one or more outward-facing recesses of the nipple, thereby to unlock the spout from the faucet body.

Additionally, the one or more inward-facing and outward-facing recesses include two or more mutually indexable pairs of inward-facing and outward-facing recesses, and the one or more moveable, ferromagnetic locking elements include two or more moveable, ferromagnetic locking elements.

Further, the nipple and spout each have a cylindrical end portion adapted for mutual mating engagement, the one or more outward-facing recesses are constituted by a circumferential locking groove formed on the nipple; and the one or more inward-facing recesses is one or more locking element housing recesses formed to be in registration with the circumferential locking groove.

Additionally, the one or more locking element housing recesses includes two or more locking element housing recesses, and the one or more moveable, ferromagnetic locking elements include two or more moveable, ferromagnetic locking elements.

Further, the two or more locking element housing recesses include a pair of diametrically opposed locking element housing recesses.

Additionally, the cylindrical end portions are mounted along a common axis of symmetry, and the circumferential locking groove is formed along the entire circumference of the nipple, thereby facilitating full, relative axial rotation of the spout relative to the faucet body.

Further, there is also provided a magnetic tool having a cylindrical inward-facing surface formed so as to fit about the cylindrical end portion of the spout, operative to apply to the one or more ferromagnetic locking elements a magnetic force opposite to and greater than the magnetic force applied by the locking magnet, thereby to unlock the spout from the faucet body.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a fastening system for selectably fastening a female member and a male member together, according to certain embodiments.

In the context of some embodiments of the present disclosure, without limiting, the term "male member" is used to mean an element or an end portion of an element configured for mating engagement with and fastening to a female member, as appropriate to the context in which it is described herein.

In the context of some embodiments of the present disclosure, without limiting, the term "female member" is used to mean an element or an end portion of an element configured for mating engagement with and fastening to a male member, as appropriate to the context in which it is described herein.

The male member and female member can be fastened using moveable ferromagnetic locking elements that are moved by a magnetic force to lock the male member and female member together. The magnetic force may be applied continuously to the moveable ferromagnetic locking elements so as to prevent the male and female members from separating in the absence of an equal or greater opposite magnetic force which causes a retraction of the locking elements, thereby to unlock the male and female members from each other. As will be understood from the description below, the locking elements may be ferromagnetic in as far as they are formed from a ferromagnetic material and are thus susceptible to magnetic attraction, but are not magnetized, per se; or they may be magnets. Furthermore, the locking elements may be of any predetermined useful shape, schematically illustrated herein as having an elongated peg-shape and, alternatively, being spherical.

Figure 3:
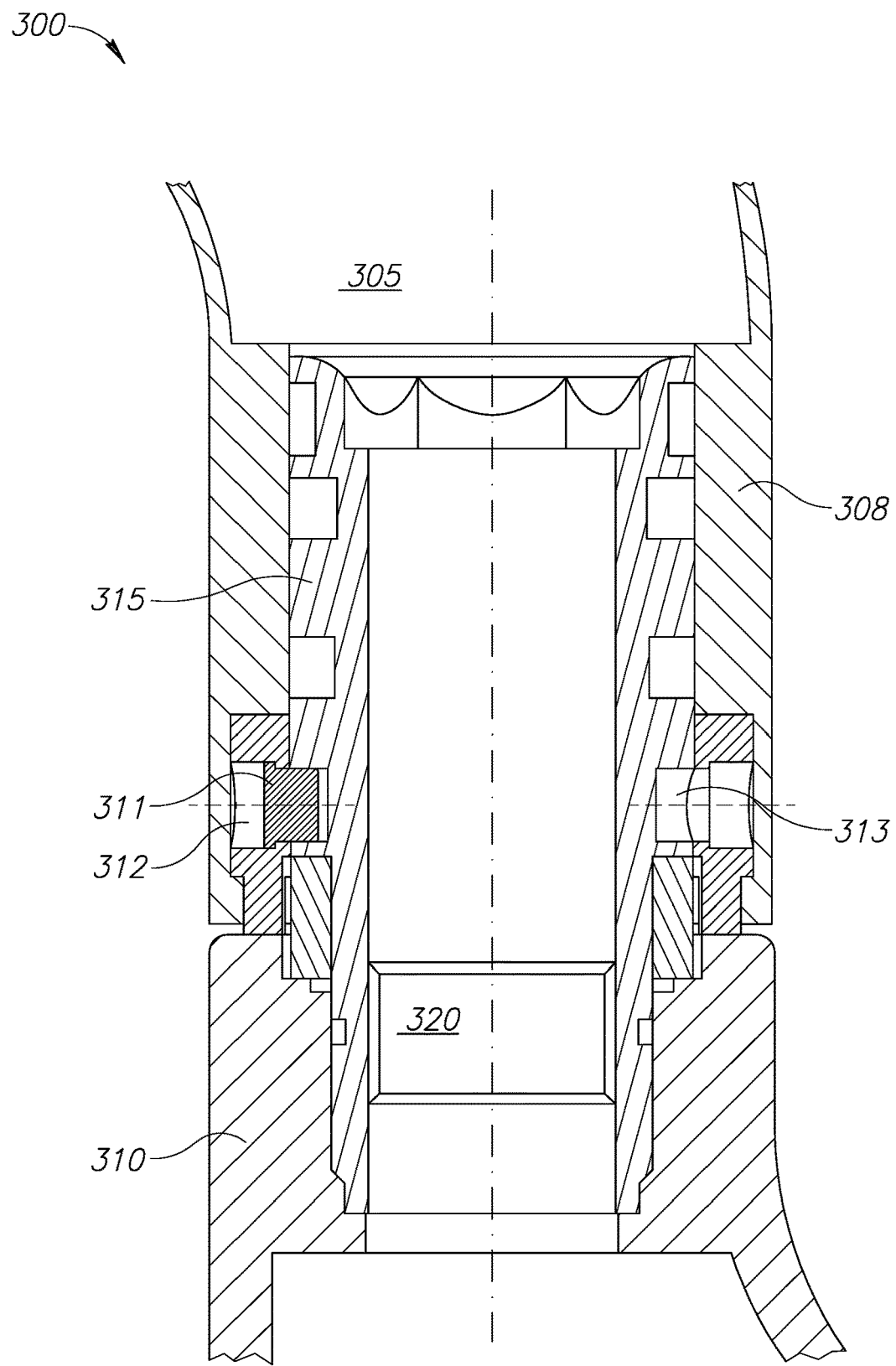
FIG. 3 schematically illustrates an enlarged cross-sectional view of a portion of a faucet in which a fastening system of FIGS. 1A-2D is implemented, seen when fully assembled, according to certain embodiments.
Figure 4:
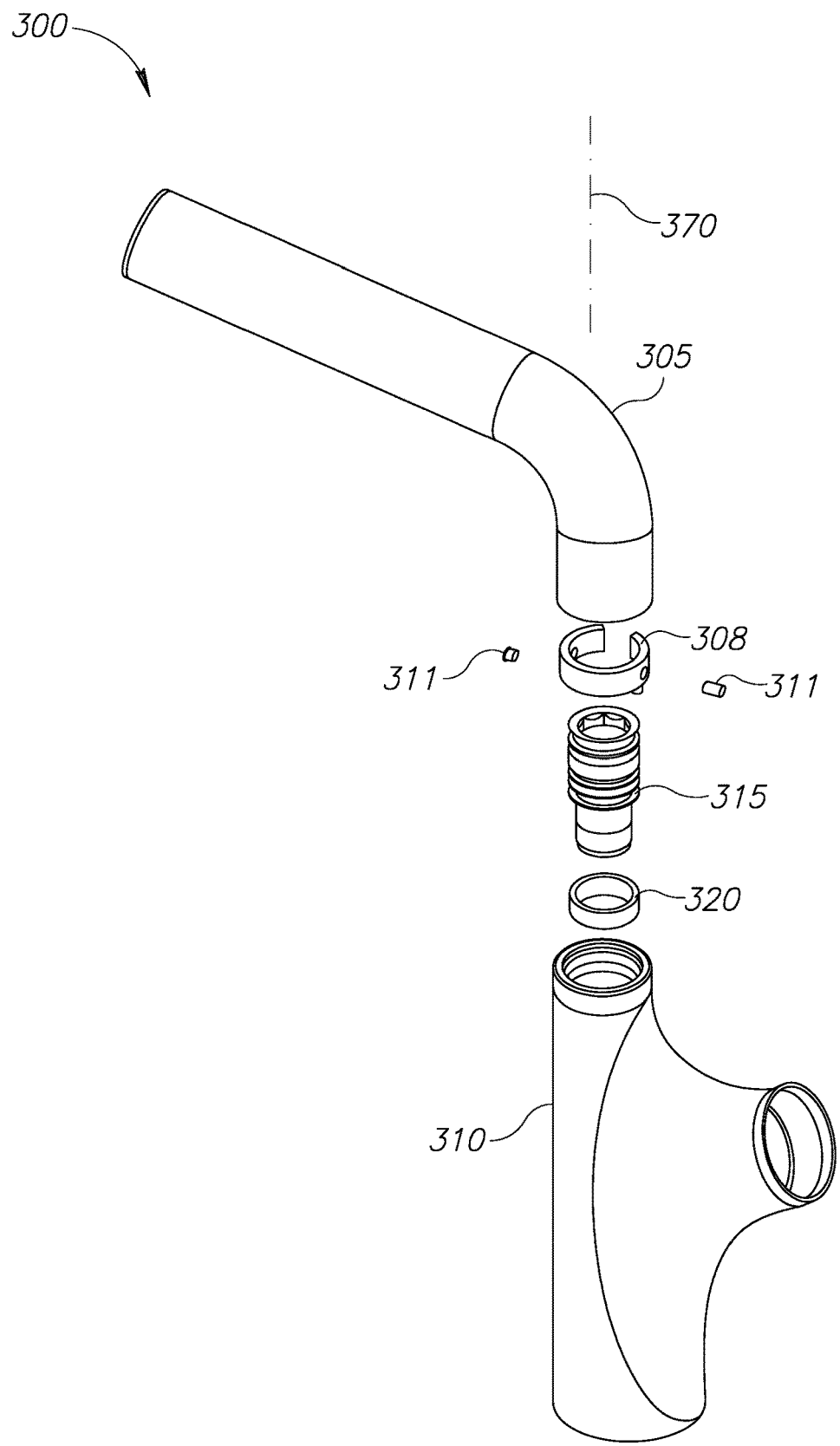
FIG. 4 schematically illustrates an exploded view of the faucet depicted in FIG. 3.

In certain embodiments, the male member can be a faucet body and spout as further described herein in FIG. 3-4. The female member can be a faucet spout having a cylindrical end portion configured to fit over a spout nipple in mating connection therewith.

Figure 5:
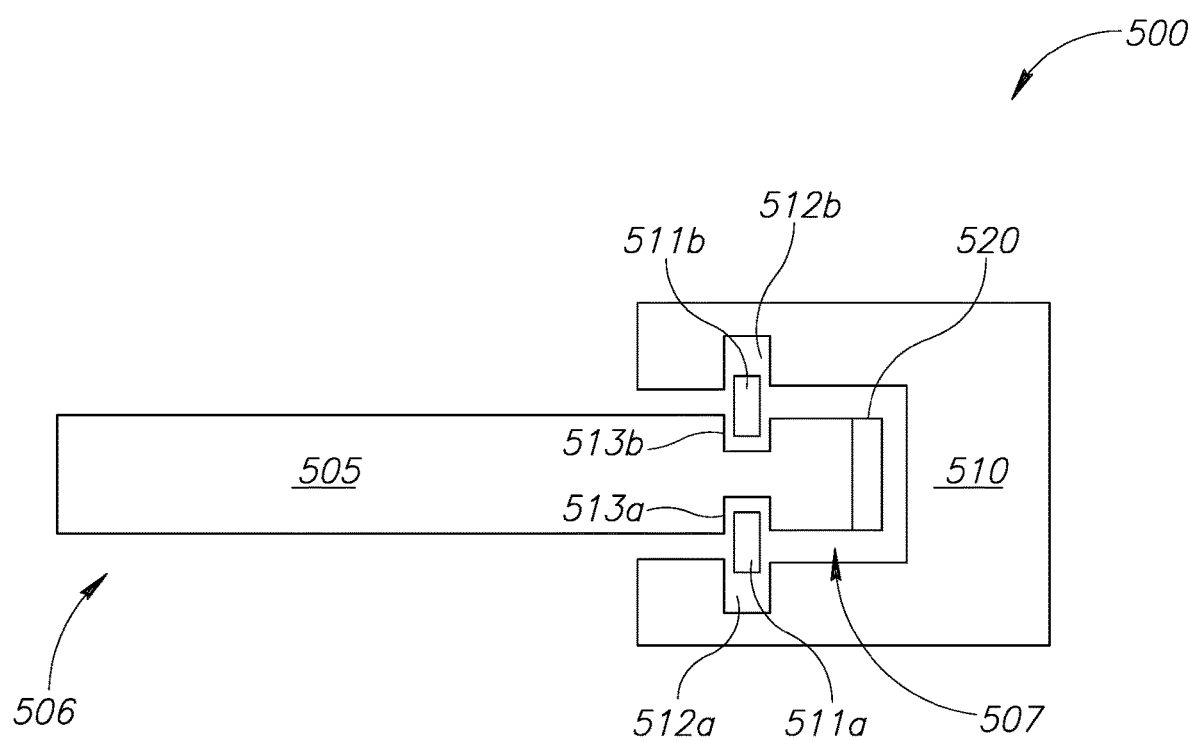
FIG. 5 schematically illustrates an enlarged cross-sectional view of a portion of a door knob employing a fastening system similar to that shown and described herein in conjunction with FIGS. 1-2D.

In certain embodiments of the subject matter, the fastening system can be implemented for fastening and disengaging a door handle, as further described in FIG. 5.

In yet further embodiments, various embodiments of the fastening system exemplified herein may be adapted for fastening male and female members in a variety of devices and arrangements, not merely those exemplified herein by way of not limiting example.

Figure 1A:
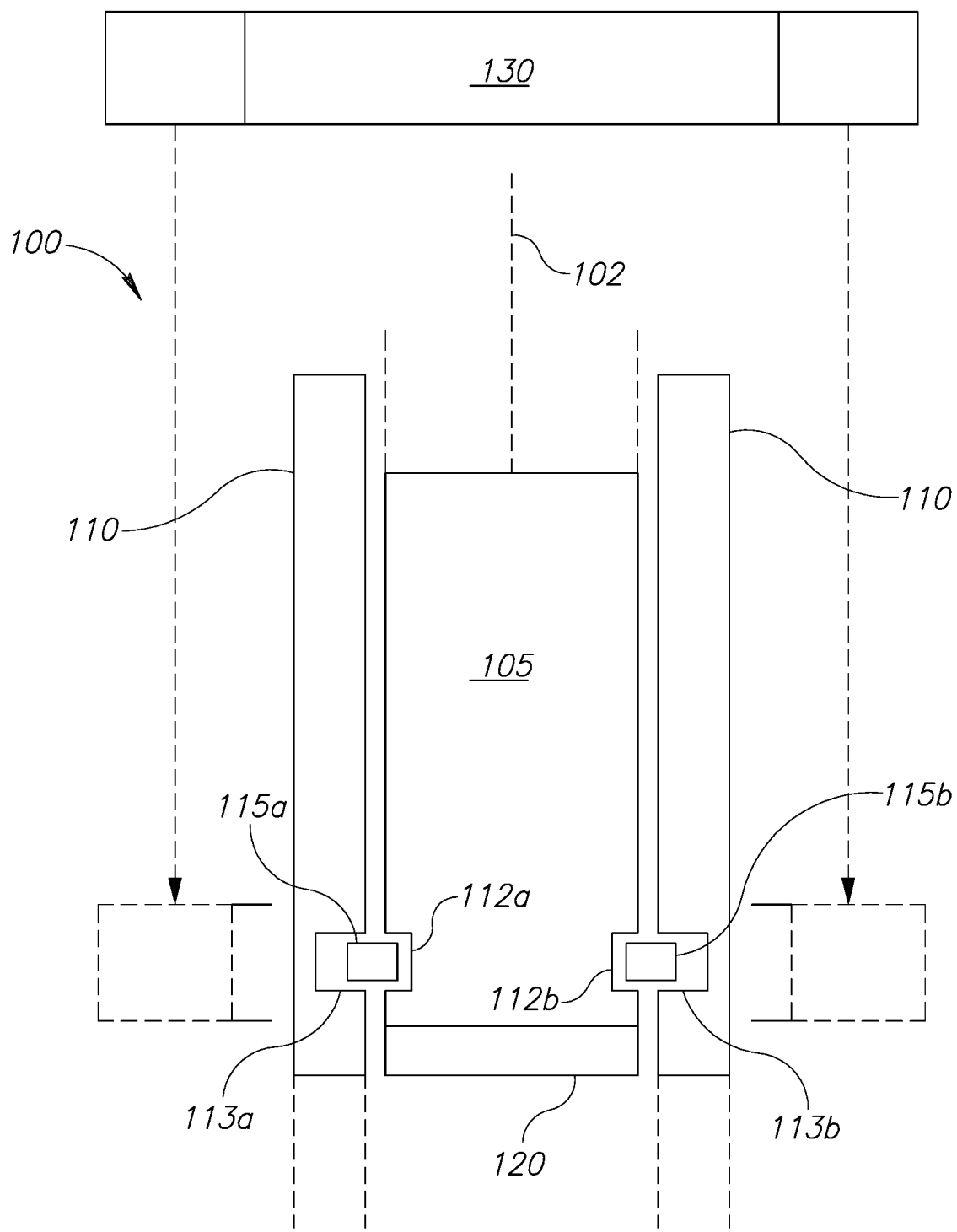
FIGS. 1A and 1B schematically illustrate cross-sectional views of a fastening system, according to certain embodiments.

Reference is now made to FIG. 1A, schematically illustrating a fastening system 100, according to certain embodiments. In the illustrated example, the fastening system 100 includes a male member 105 configured to fit within and fasten to a female member 110. Female member 110 is seen to have formed therein two or more inward-facing recesses, depicted by reference numerals 113a and 113b. Male member 105 has formed thereon two or more outward-facing recesses 112a and 112b arranged for selectable alignment with inward-facing recesses 113a and 113b. Fastening system 100 includes two moveable ferromagnetic locking elements, depicted by reference numerals 115a, 115b housed in inward-facing recesses 113a, 113b. In the present embodiment, locking elements 115a and 115b are seen to have a generally elongated, peg shape. Outward-facing recesses 112a, 112b are formed so as to be in mutual registration with inward-facing recesses 113a, 113b when male and female members 105 and 110 are in a predetermined position of mutual engagement, as described below. Fastening system 100 also includes a locking magnet 120 which, when male and female members 105 and 110 are in a position of mating engagement, as shown, applies to ferromagnetic locking elements 115a, 115b a radial magnetic force component so as to pull them radially inward, causing them to become partially inserted into outward-facing recesses 112a and 112b. In this position, each locking element extends across or straddles a pair of opposing recesses, thereby to lock the male female members 105 and 110, together.

In the presence of a magnetic force opposite to and greater than the magnetic force applied by locking magnet 120, moveable ferromagnetic locking elements 115a, 115b are magnetically pulled outwardly from outward-facing recesses 112a, 112b of male member 105, into full retraction within inward-facing recesses 113a and 113b thereby unlocking male member 105 and female member 110. In certain embodiments, there may be provided a magnetic tool 130 which is configured to fit over the exterior of female member 110, for this purpose. The magnetic tool 130 may have a cylindrical inward-facing surface formed so as to fit about the cylindrical end portion of female member 110.

The male member 105 and female member 110, respectively, may be cylindrical. Correspondingly, while outward-facing recesses 112a and 112b may be discrete recesses, such that male member 105 and female member 110 engage and lock in a single position of mutual registration between the outward- and inward-facing recesses 112a, 112b and 113a, 113b, respectively; outward-facing recesses 112a and 112b may alternatively be provided by one or more circumferential locking grooves arranged to be in registration with inward-facing recess 113a and 113b, respectively, when male and female members 105 and 110, respectively, are in a predetermined position of mutual engagement. Typically, a single circumferential locking groove is provided. In this embodiment, the magnetic tool 130 can include a suitably configured curved surface, possibly a partial or complete annulus, suitable for abutting the exterior of the female member 110 when seeking to unfasten the male and female members 105, 110, one from the other.

In certain embodiments, the cylindrical male member 105 and female member 110 can be mounted along a common axis of symmetry, depicted by reference numeral 102, and the circumferential locking groove is formed in a plane which is normal to the axis of symmetry 102, along at least a portion of the circumference of the male member, thereby facilitating axial rotation of male member 105 and female member 110, relative to one another. In this embodiment, locking magnet 120 is preferably at least a partial annulus which extends parallel to and along the length of the circumferential locking groove, thereby to continue to apply a magnetic locking force to the locking elements at all times.

Figure 1B:
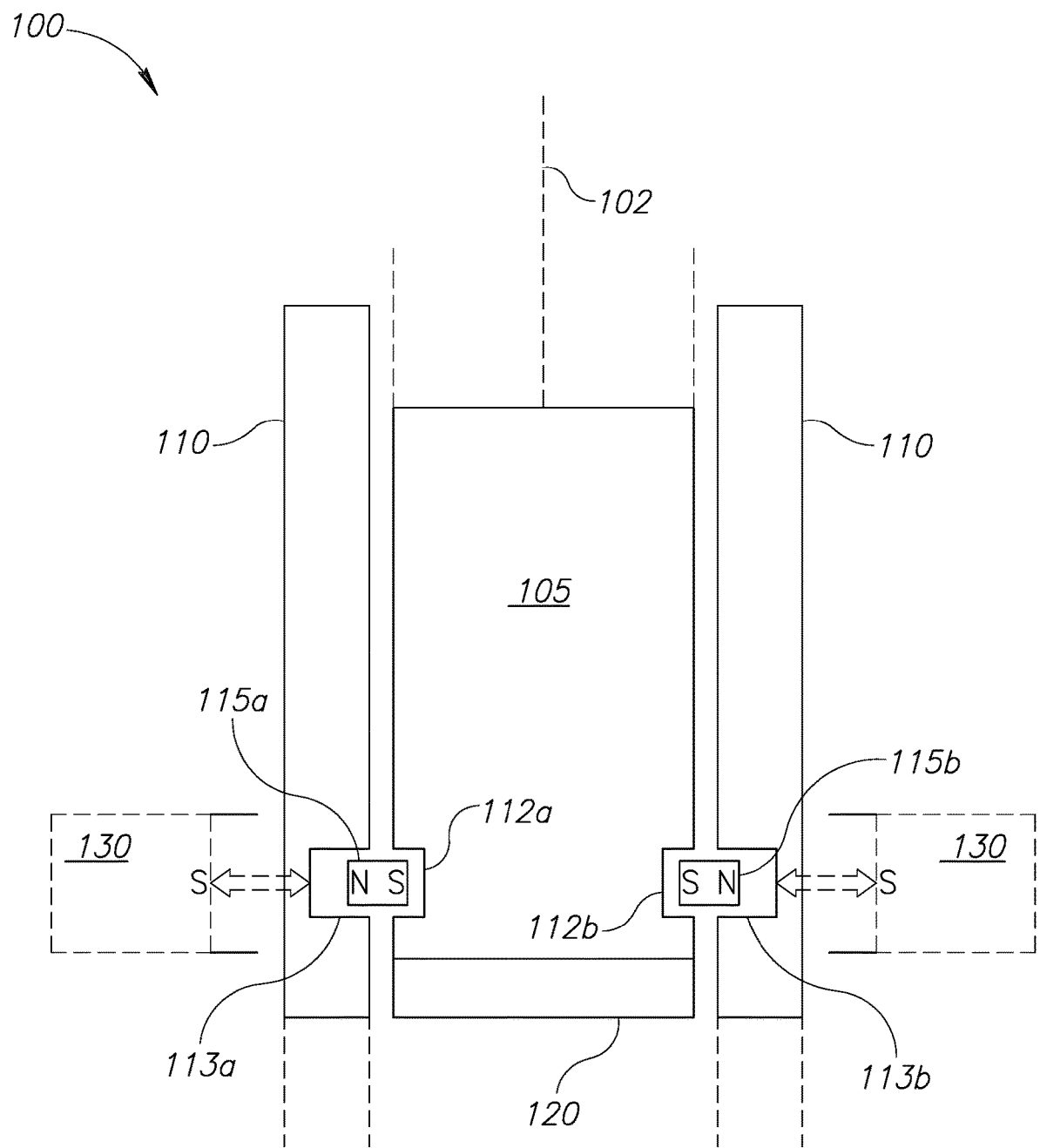

Referring now briefly to FIG. 1B, there is illustrated a system which is almost identical to that shown and described above in conjunction with FIG. 1A, and which is thus described herein only with regard to the differences relative to that system.

Figure 1C:
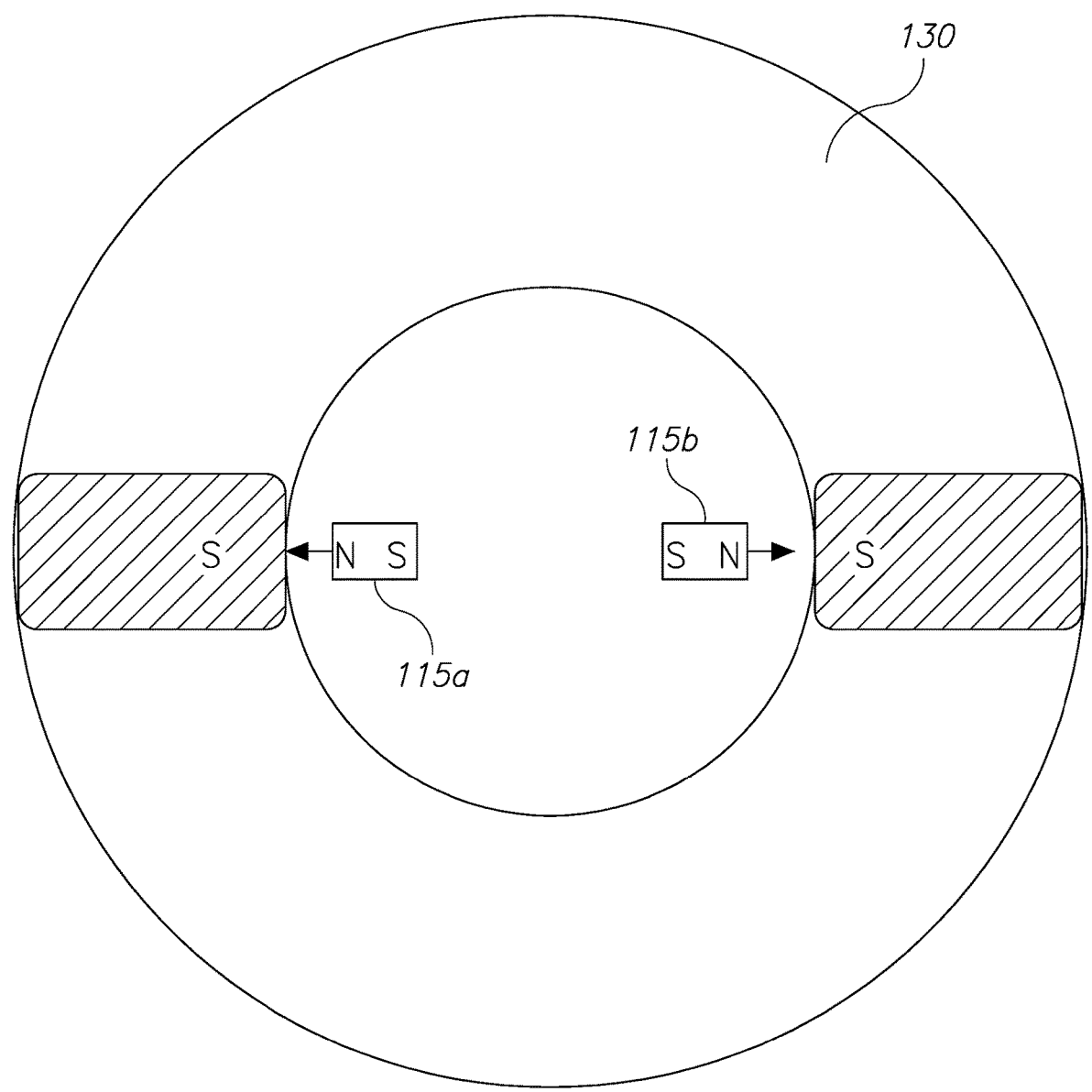
FIG. 1C is a schematic plan view of a tool for magnetically releasing portions of the fastening system of FIG. 1B.

In FIG. 1B, the ferromagnetic locking elements 115a and 115b are seen to be magnetic, having, by way of example, north and south polarities as depicted in the drawing. Referring now also to FIG. 1C, there is depicted a magnetic release tool 130 which, when brought into magnetic proximity to locking elements 115a and 115b is operative to apply a magnetic force which is sufficiently strong to overcome the inward attraction of locking magnetic 120 (FIG. 1B). In particular, release tool 130, herein depicted as an annulus, configured to fit over female member 110, must have polarities opposite to those of the locking elements 115a, 115b. While the entirety of the release tool 130 may be magnetic, it is also envisaged that only specific portions thereof, those depicted by southern polarity "S" in the drawing, are magnetized, in which case tool 130 may remain permanently on the female member 110, but normally in a partially rotated position so as not to release the male and female members unintentionally, and being rotated so as to be brought into registration with the locking elements only when it is sought to release the male and female members.

Figure 1D:
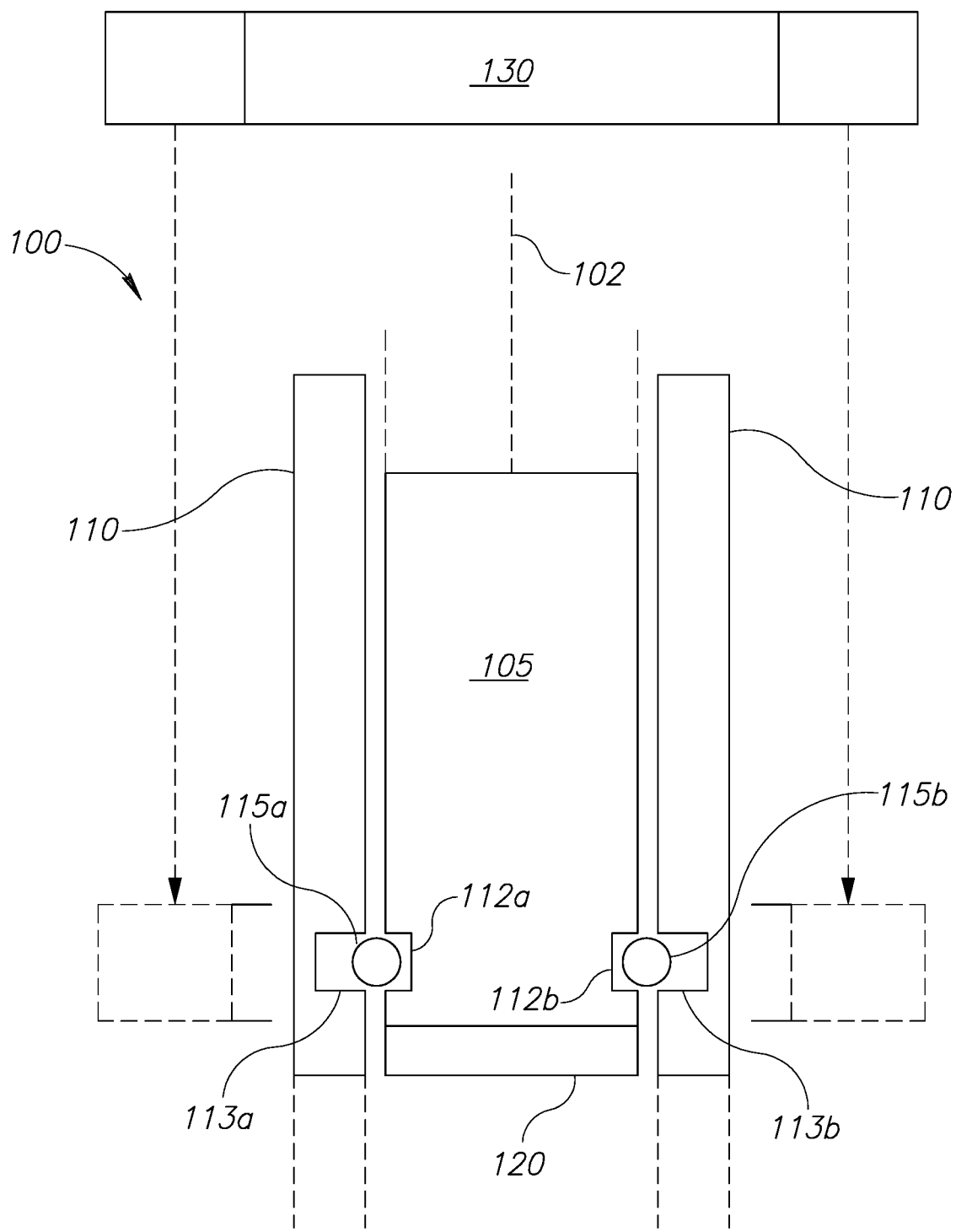
FIG. 1D schematically illustrates a cross-sectional view of a fastening system, according to a further embodiment.

Referring now briefly to FIG. 1D, there is illustrated a system which is almost identical to that shown and described above in conjunction with FIGS. 1A and 1B, except that ferromagnetic locking elements 115a, 115b are depicted as having a spherical shape. It will be understood that in different embodiments of the invention, ferromagnetic locking elements 115a, 115b may have any desired shape such as will serve the purpose of the present invention.

Figure 2A:
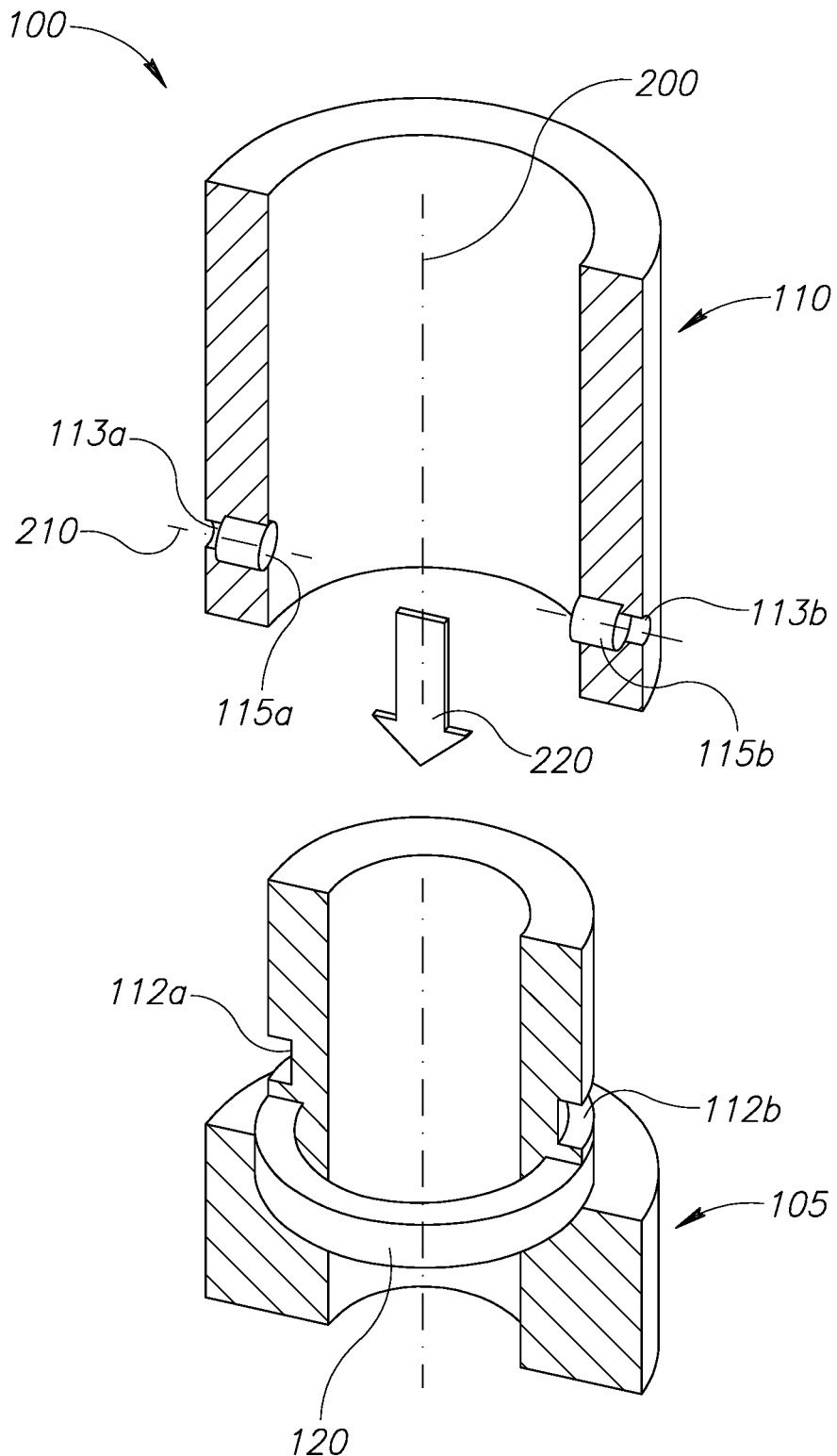
FIGS. 2A-2D schematically illustrate cross-sectional views of a fastening system in different stages of operation, according to certain embodiments.

Referring now to FIGS. 2A-2D, fastening system 100 of FIG. 1A is depicted in various stages of operation, according to certain embodiments. As seen in FIG. 2A, prior to fastening together, male member 105 and female member 110 are aligned along an axis 200 and are moved axially towards each other in a direction indicated by arrow 220 enabling male member 105 and female member 110 to be coupled together.

Figure 2B:
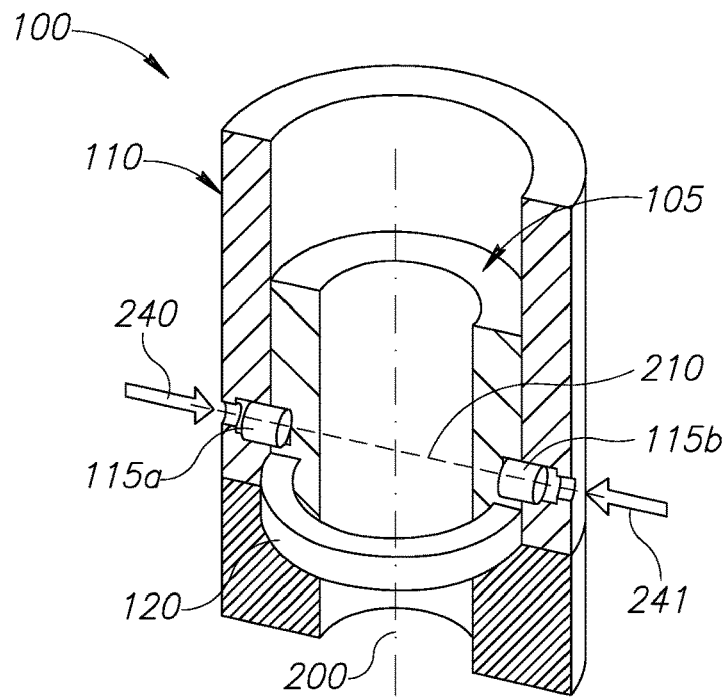

As seen in FIG. 2B, once the male and female members are fully mated, ferromagnetic locking elements 115a, 115b are exposed to an inward magnetic force component applied by locking magnet 120, so as to be moved inwardly along axis 210, as depicted by arrows 240, 241. Moveable ferromagnetic locking elements 115a, 115b move into outward-facing recesses 112a, 112b, so as to extend across inward-facing recesses 113a, 113b and outward-facing recesses 112a, 112b, thereby locking male member 105 and female member 110 together. When male member 105 and female member 110 are locked together, the fasteners, namely, the ferromagnetic locking elements 115a, 115b, are substantially invisible from the exterior. This locked position is seen in to FIG. 2C.

Figure 2C:
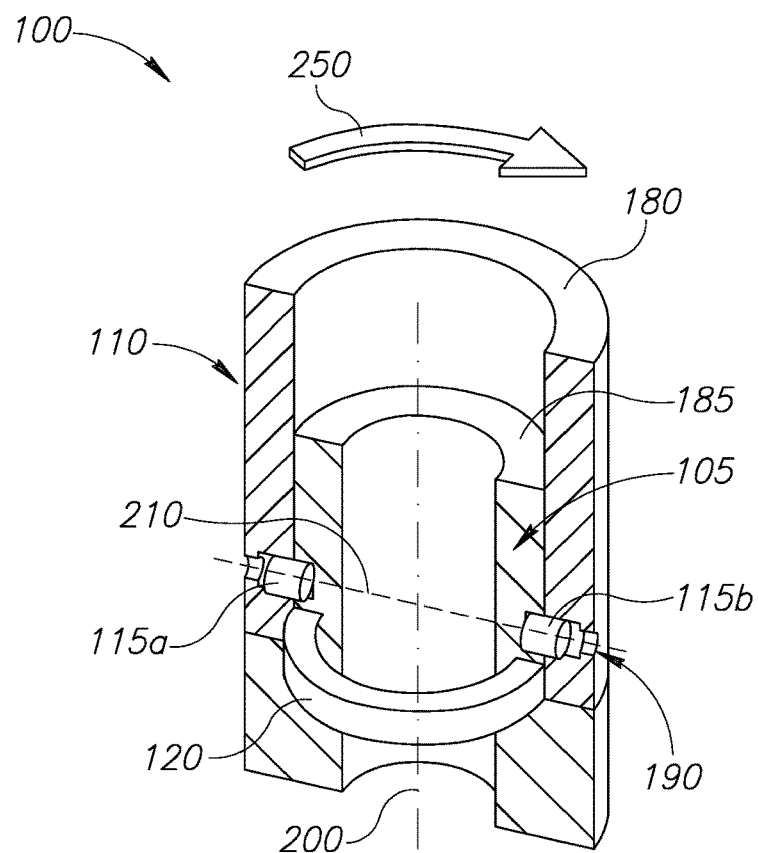

Also, as seen in FIG. 2C, when end portions 180 and 185 of the male member 105 and female member 110 are cylindrical, and when formed with locking recess 190, the male member 105 and female member 110 are free to rotate relative to one another. This is depicted by arrow 250. During this relative rotation, locking elements 115a and 115b travel along the locking recess 190, while being magnetically retained therewithin by locking magnet 120.

Figure 2D:
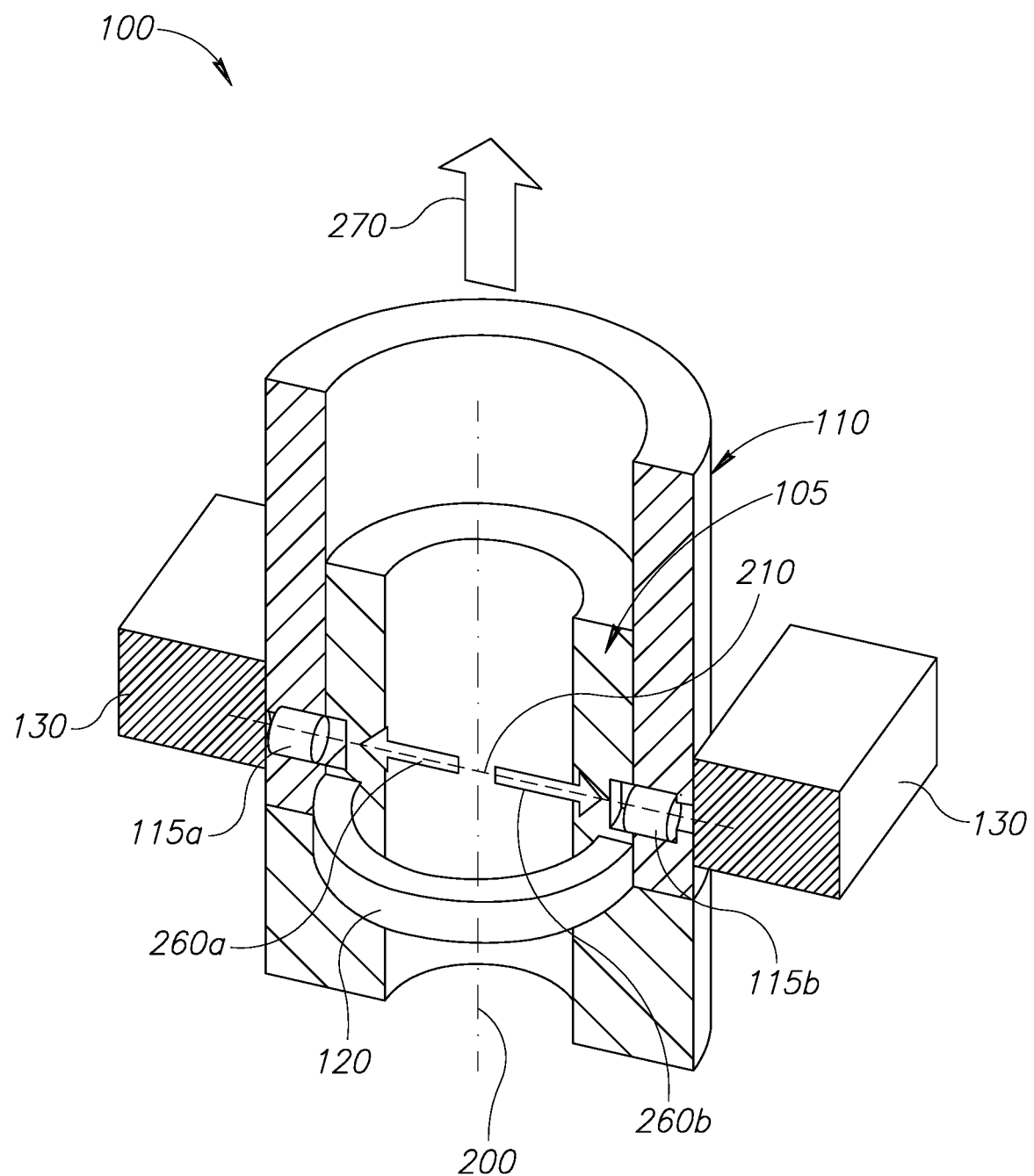

Reference is now made to FIG. 2D, schematically illustrating releasing male member 105 and female member 110, according to certain embodiments of the subject matter. As described above, there may be provided magnetic tool 130 configured to fit over the exterior of female member 110, operative to apply to moveable ferromagnetic locking elements 115a, 115b a magnetic force opposite to and greater than the magnetic force applied by locking magnet 120, thereby fully retracting locking elements 115a and 115b into inward-facing recess 113a, 113b in the direction represented by arrows 260a, 260b, so as to unlock male 105 and female member 110. Once unlocked, male member 105 and female member 110 can be mutually disengaged, as shown by arrows 270, to move independently of each other.

Reference is now made to FIGS. 3 and 4, in which is illustrated a faucet in which a fastening system of FIGS. 1-2D is implemented. The illustrated embodiment is not specifically described, except with regard to specific features. The illustrated faucet, referenced 300 includes a faucet body 310 from which there protrudes a nipple 315, equivalent to male member 105 (FIG. 1A). and a spout 305. Nipple 315 includes at least one outward-facing recess, depicted by reference numeral 313, similar in function to outward recesses 113a, 113b (FIG. 1A). Spout 305 has an end portion 308, equivalent to female member 110 (FIG. 1A), having at least one inward-facing recess, depicted by reference number 312. Faucet 300 includes at least one moveable ferromagnetic locking element 311, housed within inward-facing recess 312; and a locking magnet 320 mounted onto nipple 315, in magnetic proximity to outward-facing recess 313 thereof.

Preferably, outward-facing and inward-facing recesses 313 and 312, respectively, have similar cross-sectional dimensions and are formed to be in mutual registration when spout end portion 308 is positioned over nipple 315.

Preferably, nipple 315 and spout end portion are cylindrical, and the at least one outward-facing recesses 313 are implemented as one or more circumferential locking grooves formed on nipple 315, thereby to enable at least partial relative rotation of spout 305 relative to the faucet body 310.

Reference is now made to FIG. 5, in which is illustrated a door handle 500 embodying the present invention as described generally with regard to FIG. 1A, hereinabove. For the purpose of this description, the handle is deemed to include both a female member, embodied here in a hand grip 510; and a male member, embodied here in a spindle 505; wherein the spindle is connected at a distal, free end 506 to a door lock mechanism (not shown), and at its other, proximal end 507 is engaged by hand grip 510 by which the spindle may be turned in order to open the door lock. In contrast with prior art solutions in which a pin or screw is often used to connect a door handle to a spindle, door handle 500 employs a fastening system constructed and operative in accordance with the present invention substantially as described hereinabove in conjunction with FIG. 1A, for selectable connection of hand grip 510 to spindle 505. Among advantages of using the system of the invention in this context are both convenience and aesthetic, with the connection being substantially invisible from the exterior.

In the illustrated embodiment, spindle 505 includes two outward-facing recesses, depicted as numeral references 513a, 513b, and grip 510 includes a corresponding pair of inward-facing recesses, depicted as numeral references 512a, 512b. There are also provided two moveable ferromagnetic locking elements, depicted as numeral references 511a, 511b. Preferably, outward-facing recesses 513a, 513b and inward-facing recesses 512a, 512b have similar cross-sectional dimensions and are formed to be in mutual registration when grip 510 is placed over spindle 505 in a predetermined position of engagement. The system also includes a locking magnet 520 shown schematically as being mounted onto proximal end 507 of spindle 505, in magnetic proximity to outward-facing recesses 513a, 513b thereof.

In a manner similar to that described hereinabove in conjunction with FIGS. 1-4, when outward-facing recesses 513a, 513b and inwardly-facing recesses are moved into mutual registration, a radial component of the magnetic force of locking magnet 520 pulls ferromagnetic locking elements 511a, 511b inwardly into outward-facing recesses 513a, 513b, such that the locking elements straddle both the inward-facing recesses 512a, 512b and the outward-facing recesses 513a, 513b, thereby locking grip 510 and spindle 505 together.

As with embodiments of the invention shown and described above in conjunction with FIGS. 1-4, grip 510 may be released from spindle 505 by the application of a magnetic force opposite to and greater than the magnetic force applied by locking magnet 520, so as to pull moveable ferromagnetic locking elements 511a, 511b radially outward, causing them to retract into the inward-facing recesses 512a, 512b of grip 510. A purpose-built tool for this purpose may be provided, as generally described above and shown in conjunction with the embodiments of FIGS. 1-4.

It is to be understood that the invention is not necessarily limited in its application to the details of construction and the arrangement of the components and/or methods set forth in the description and/or illustrated in the drawings and/or the examples. The invention is capable of other embodiments or of being practiced or carried out in various ways.

The corresponding structures, materials, acts, and equivalents of all means or step plus function elements in the claims below are intended to include any structure, material, or act for performing the function in combination with other claimed elements as specifically claimed. As used herein, the singular forms "a" "an" and "the" are intended to include the plural forms as well, unless the context clearly indicates otherwise. It will be further understood that the terms "comprising", "including" and/or "having" and other conjugated terms such as, by way of example, "a thing property" implies a property of the thing, unless otherwise clearly evident from the context thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

What is claimed is:

1. A system for selectably fastening a female member with a male member adapted to fit inside said female member, wherein said female member has at least one inward-facing recess and said male member has at least one outward-facing recess, said recesses being of similar cross-sectional dimensions, and wherein said male and female members are configured for mutual positioning so as to bring said outward-facing and inwardly-facing recesses into mutual registration, wherein said system includes:

at least one moveable, ferromagnetic locking element housed within said at least one inward-facing recess formed in said female member; and a locking magnet mounted onto said male member, in magnetic proximity to said at least one outward-facing recess, wherein:

in the presence of a magnetic force applied by said locking magnet, mating of said male and female members so as to bring said outward-facing and inwardly-facing recesses into mutual registration causes said at least one moveable, ferromagnetic locking element to move inwardly into said at least one outward-facing recess so as to extend across both of said at least one inward-facing and outward-facing recesses, thereby to lock said male and female members together, in the presence of a magnetic force opposite to and greater than the magnetic force applied by said locking magnet, said at least one moveable, ferromagnetic locking element is operative to move outward from said at least one outward-facing recess of said male member, thereby to unlock said male and female members, said male and female members have cylindrical end portions adapted for mating engagement, said at least one outward-facing recess is a circumferential locking groove;

said at least one inward-facing recess is at least one locking element housing recess formed to be in registration with said circumferential locking groove; and said locking magnet is mounted onto said male member, in magnetic proximity to said circumferential locking groove, such that in the presence of a magnetic force applied by said locking magnet, mating of said male and female members so as to bring said at least one locking element housing recess into registration with said circumferential locking groove causes said at least one moveable, ferromagnetic locking element to move inwardly into said circumferential locking groove so as to extend across both of said at least one locking element housing recess into registration with said circumferential locking groove, thereby to lock said male and female members together.

2. A system according to claim 1, wherein said at least one inward-facing and outward-facing recesses comprise at least two mutually indexable pairs of inward-facing and outward-facing recesses, and said at least one moveable, ferromagnetic locking element comprises at least two moveable, ferromagnetic locking elements.

3. A system according to claim 1, wherein said at least one locking element housing recess comprises at least two locking element housing recesses, and said at least one moveable, ferromagnetic locking element comprises at least two moveable, ferromagnetic locking elements.

4. A system according to claim 3, wherein said at least two locking element housing recesses comprises a pair of diametrically opposed locking element housing recesses.

5. A system according to claim 1, wherein said cylindrical end portions are mounted along a common axis of symmetry, and said circumferential locking groove is formed along the entire circumference of said male member, thereby facilitating full, relative axial rotation of said cylindrical end portions, one to the other.

6. A system according to claim 5, also including a magnetic tool having a cylindrical inward-facing surface formed so as to fit about the cylindrical end portion of said female member, operative to apply to said at least one ferromagnetic locking element a magnetic force opposite to and greater than the magnetic force applied by said locking magnet, thereby to unlock said male and female members.

7. A system according to claim 6, wherein said magnetic tool comprises an annulus.

8. A system according to claim 1, also including a magnetic tool formed so as to fit over the exterior of said female member, operative to apply to said at least one ferromagnetic locking element a magnetic force opposite to and greater than the magnetic force applied by said locking magnet, thereby to unlock said male and female members.

9. A system according to claim 1, wherein:

said male member is a faucet body and said cylindrical end portion thereof comprises the spout nipple thereof; and said female member is a faucet spout and said cylindrical end portion thereof is configured for mating connection with said spout nipple.

10. A faucet which comprises:

a faucet body having a nipple connected thereto, said nipple having at least one outward-facing recess;

a spout having an end portion for mating engagement with said nipple and having at least one inward-facing recess, said outward- and inward-facing recesses being of similar cross-sectional dimensions and formed to be in mutual registration when said end portion of said spout is positioned over said nipple;

at least one moveable, ferromagnetic locking element housed within said at least one inward-facing recess formed in said end portion of said spout; and a locking magnet mounted onto said nipple, in magnetic proximity to said at least one outward-facing recess thereof, wherein, in the presence of a magnetic force applied by said locking magnet, mating of said spout and said nipple so as to bring said outward-facing and inwardly-facing recesses into mutual registration causes said at least one moveable, ferromagnetic locking element to move inwardly into said at least one outward-facing recess so as to extend across both of said at least one inward-facing and outward-facing recesses, thereby to lock said spout to said faucet body.

11. A faucet according to claim 10, wherein, in the presence of a magnetic force opposite to and greater than the magnetic force applied by said locking magnet, said at least one moveable, ferromagnetic locking element is operative to move outward from said at least one outward-facing recess of said nipple, thereby to unlock said spout from said faucet body.

12. A faucet according to claim 11, wherein said at least one inward-facing and outward-facing recesses comprise at least two mutually indexable pairs of inward-facing and outward-facing recesses, and said at least one moveable, ferromagnetic locking element comprises at least two moveable, ferromagnetic locking elements.

13. A faucet according to claim 11, wherein said nipple and said spout have cylindrical end portions adapted for mating engagement, said at least one outward-facing recess is a circumferential locking groove formed on said nipple; and said at least one inward-facing recess is at least one locking element housing recess formed to be in registration with said circumferential locking groove.

14. A faucet according to claim 13, wherein said at least one locking element housing recess comprises at least two locking element housing recesses, and said at least one moveable, ferromagnetic locking element comprises at least two moveable, ferromagnetic locking elements.

15. A faucet according to claim 14, wherein said at least two locking element housing recesses comprises a pair of diametrically opposed locking element housing recesses.

16. A faucet according to claim 13, wherein said cylindrical end portions are mounted along a common axis of symmetry, and said circumferential locking groove is formed along the entire circumference of said nipple, thereby facilitating full, relative axial rotation of said spout relative to said faucet body.

17. A faucet according to claim 11, also including a magnetic tool having a cylindrical inward-facing surface formed so as to fit about the cylindrical end portion of said spout, operative to apply to said at least one ferromagnetic locking element a magnetic force opposite to and greater than the magnetic force applied by said locking magnet, thereby to unlock said spout from said faucet body.

* * * * *